United States Patent [19]

Absil et al.

[11] Patent Number: 4,810,361
[45] Date of Patent: Mar. 7, 1989

[54] RESID HYDROTREATING PROCESS USING LANTHANA-ALUMINA-ALUMINUM PHOSPHATE CATALYST

[75] Inventors: Robert P. L. Absil, Mantua; Philip J. Angevine, West Deptford; Arthur W. Chester, Cherry Hill; Garry W. Kirker, Washington Township, Gloucester County, N.J.

[73] Assignee: Mobil Oil Corporation, New York, N.Y.

[21] Appl. No.: 50,446

[22] Filed: May 18, 1987

[51] Int. Cl.$^4$ .............................. C10G 45/04
[52] U.S. Cl. .................. 208/213; 208/111; 208/216 R; 208/251 H; 208/254 H
[58] Field of Search ......... 208/216 R, 216 PP, 251 H, 208/254 H, 111, 213

[56] References Cited

U.S. PATENT DOCUMENTS

| | | | |
|---|---|---|---|
| 2,876,266 | 3/1959 | Wegner | 260/641 |
| 3,213,035 | 10/1965 | Morrell | 252/435 |
| 3,755,146 | 8/1973 | Harris et al. | 208/112 |
| 3,801,704 | 4/1974 | Kobayashi et al. | 423/309 |
| 3,891,541 | 6/1975 | Oleck et al. | 208/89 |
| 3,904,550 | 9/1975 | Pine | 208/138 |
| 4,137,151 | 1/1979 | Csicsery | 208/120 |
| 4,179,358 | 12/1979 | Swift et al. | 208/114 |
| 4,210,560 | 7/1980 | Kehl | 252/437 |
| 4,228,036 | 10/1980 | Swift et al. | 252/437 |
| 4,310,440 | 1/1982 | Wilson et al. | 208/254 H |
| 4,328,127 | 5/1982 | Angevine et al. | 252/439 |
| 4,351,717 | 9/1982 | Jaffe | 208/216 |
| 4,363,748 | 12/1982 | Crum et al. | 252/437 |
| 4,376,067 | 3/1983 | Vogel et al. | 252/437 |
| 4,382,877 | 5/1983 | Kehl | 252/437 |
| 4,382,878 | 5/1983 | Kehl | 252/437 |
| 4,650,564 | 3/1987 | Occelli et al. | 208/113 |
| 4,670,134 | 6/1987 | Kolts et al. | 208/122 |

FOREIGN PATENT DOCUMENTS 3136584 8/1984 Australia .
2068253A 8/1981 United Kingdom .

*Primary Examiner*—Curtis R. Davis
*Assistant Examiner*—Helane Myers
*Attorney, Agent, or Firm*—Alexander J. McKillop; Charles J. Speciale; Dennis P. Santini

[57] ABSTRACT

This invention relates to a new and useful improvement in a process for upgrading petroleum residua. The process comprises contacting a vacuum or atmospheric resid feed with a metal-containing lanthana-alumina-aluminum phosphate catalyst whereby the resid feedstock is simultaneously demetallized and desulfurized.

15 Claims, No Drawings

RESID HYDROTREATING PROCESS USING LANTHANA-ALUMINA-ALUMINUM PHOSPHATE CATALYST

CROSS-REFERENCE

This application is related by subject matter to copending application Ser. No. 938,476, filed Dec. 5, 1986; and to copending application Ser. No. 050,445, filed on even date herewith.

BACKGROUND OF THE INVENTION

1. Field of the Invention

This invention is directed to an improved petroleum residua upgrading process comprising hydrotreating of resids in the presence of a metal-containing amorphous lanthana-alumina-aluminum phosphate catalyst.

2. Discussion of the Prior Art

Many petroleum based stocks contain contaminants such as, for example, sulfur, nitrogen and metals. It is desirable, particularly if these stocks are to be further processed, that the contaminants be removed. This is an operation usually requiring use of a catalyst.

It has been conventional in the art to effect contaminant removal, such as sulfur removal from hydrocarbon stocks, by subjecting them to treatment with hydrogen at elevated temperature and pressure while in contact with a catalyst containing hydrogenating components. Typically the hydrogenating components of such known catalysts are Group VIB or VIII metals, or other oxides or sulfides. These hydrogenating components may be supported on a variety of well known carriers, such as, for example, crystalline and amorphous materials. Crystalline materials include zeolites and other silicates. Amorphous materials include silica, silica-alumina, clays, oxides of zirconium, titanium, cerium, thorium, lanthanum, calcium and magnesium, and phosphates of zinc, zirconium, thorium, cerium, calcium, magnesium and aluminum. A listing of such materials appears in Australian Pat. No. 31365/84.

Zeolites, both natural and synthetic, have been demonstrated to be effective catalyst supports. A large variety of synthetic zeolites are known, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245) and zeolite ZSM-23 (U.S. Pat. No. 4,076,842), merely to name a few.

Aluminum phosphates are taught in U.S. Pat. Nos. 4,310,440; 4,385,994; 4,365,095; 4,361,705; 4,222,896; 4,210,560; 4,179,358; 4,158,621; 4,071,471; 4,014,945; 3,904,550 and 3,697,550, for example. Microporous aluminum phosphates have a composition typified as: ps

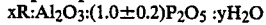

wherein R is an organic amine or quaternary ammonium salt entrapped within the aluminum phosphate and plays a role as crystallization template, x and y representing the amounts of R and H$_2$O needed to fill the microporous voids.

U.S. Pat. No. 4,440,871 teaches material called silicoaluminophosphate without non-aluminum metals. Individual silicoaluminophosphate structures are shown in U.S. Pat. Nos. 4,623,527; 4,632,811 and 4,639,357. An antimonophosphoaluminate structure is taught in U.S. Pat. No. 4,619,818.

The phosphorus-substituted zeolites of Canadian Pat. Nos. 911,416; 911,417 and 911,418 are referred to as "aluminosilicophosphate" zeolites. These latter materials containing silicon, aluminum and phosphorus are characterized by the general formula:

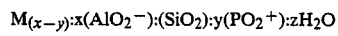

wherein M is a monovalent cation, x is approximately 0.125–1.5, y is 0.05–1.0 and z is the number of hydration water molecules. Structural replacement of silicon with phosphorus has been realized in materials called silica clathrates (West German Pat. No. 3,128,988).

U.S. Pat. No. 4,363,748 describes a combination of silica and aluminum-calcium-cerium phosphate as a low acid activity catalyst for oxidative dehydrogenation. Great Britain Pat. No. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid.

U.S. Pat. No. 4,382,877 describes a catalyst composition of a particular metal on a support containing (1) a compound of magnesium, calcium, strontium or barium, (2) alumina and (3) aluminum phosphate, the support having an average pore radius area of from 10 to 300 Angstroms, a surface area of from 100 to 350 m$^2$/g and a pore volume of from 0.3 to 1.5 cc/g. Various combinations of metal compounds, such as calcium, strontium, barium and magnesium oxide, with alumina and aluminum phosphate are described as catalyst supports in U.S. Pat. No. 4,382,878.

U.S. Pat. No. 4,376,067 describes a catalyst support containing various combinations of metal compounds, including zinc, cadmium, magnesium, calcium, strontium and barium compounds, alumina and aluminum phosphate. Magnesia-alumina-aluminum phosphate support material and its synthesis is described in U.S. Pat. No. 4,210,560. Use of a magnesia-alumina-aluminum phosphate supported catalyst for cracking is described in U.S. Pat. No. 4,179,358. U.S. Pat. No. 3,755,146 describes a high surface area catalyst support material comprising alumina, silica, titania, zirconia, boria and combinations thereof.

U.S. Pat. No. 2,876,266 describes an active silicophosphoric acid or salt phase of an amorphous material prepared by absorption of phosphoric acid by pre-molded silicates, e.g. aluminosilicates.

The importance of pore size distribution in catalysts or catalyst carriers is taught in U.S. Pat. No. 4,328,127.

Hydrotreating of residua may be defined simply as removal of sulfur, nitrogen and metal compounds by selective hydrogenation. The hydrotreating catalysts used commercially are cobalt plus molybdenum or nickel plus molybdenum used in the sulfided forms and impregnated on an alumina base. The hydrotreating operating conditions are about 1000 to 2000 psi hydrogen and about 700° F. However, the desulfurization reactions are invariably accompanied by small amounts of hydrogenation and hydrocracking, the extent of which depends on the nature of the feedstock and the severity of desulfurization. U.S. Pat. Nos. 3,891,541 and 4,351,717 teach residua hydrotreating. The catalysts taught in the latter two patents, the disclosures of which are incorporated herein by reference, comprise commercial hydrogenating components on alumina supports having particular pore size distributions.

This invention relates to a petroleum residua upgrading process. It comprises hydrotreating atmospheric or vacuum resids in the presence of a catalyst. The catalyst is a metal-containing amorphous lanthana-alumina-aluminum phosphate ("LAAP"). Neither the prior art mentioned above nor any art known to applicants relates to the use of an LAAP-supported catalyst for demetallization and desulfurization of resids. It is only applicants who have discovered hydrodemetallization advantages obtained through use of such catalysts. Moreover, the pore size distribution of applicant's material is distinctive for such materials. All this is neither disclosed nor suggested in the art.

SUMMARY OF THE INVENTION

This invention relates to an improved petroleum residua upgrading process comprising hydrotreating residua in the presence of a metal-containing amorphous lanthana-alumina-aluminum phosphate matrix having a distinctive pore size distribution.

DESCRIPTION OF EMBODIMENTS

Synthesis of the amorphous solid refractory matrix composition of the catalyst for use in the present invention is carried out in a suitable reactor vessel by (1) preparing a first and second solution separately, the first solution comprising a source of aluminum (+3 valence), a source of lanthanum (+3 valence) and phosphoric acid, and the second solution comprising a basic solution; (2) mixing the first and second solutions together with agitation, e.g. stirring, while maintaining the mixture pH at from about 8 to about 12, preferably from about 8.5 to about 9.5; and (3) recovering the amorphous solid precipitate formed during step (2).

The first solution will comprise one or more sources of aluminum ($Al^{+3}$). Such sources include as suitable examples aluminum nitrate and aluminum sulfate. The first solution will also comprise one or more sources of lanthanum ($La^{+3}$), including as suitable examples, lanthanum nitrate and lanthanum chloride. These aluminum and lanthanum metal sources are dissolved in a suitable polar solvent medium, such as water. The first solution will also comprise phosphoric acid ($H_3PO_4$), e.g. in solution with water. The composition of this first solution will be comprised as follows:

| COMPONENT | WT % OF SOLUTION |
|---|---|
| Aluminum | 0.1 to 10 |
| Lanthanum | 0.1 to 10 |
| Phosphorus | 0.2 to 5 |

The second solution will comprise a basic solution (pH of from about 10 to about 14). Suitable components of this second solution include inorganic and/or organic bases such as, for example, ammonium hydroxide, ammonia, tetraalkylammonium hydroxide and alkylamine, alkyl being methyl-, ethyl-, propyl-, butyl- or a mixture thereof, e.g. tetramethylammonium and n-propylamine.

It is believed that the exact composition of the second solution, i.e. the type and concentration of organic or inorganic base, affects the pore size distribution in the final LAAP synthesis product. For instance, the use of tetramethylammonium hydroxide in the second solution, as exemplified hereinafter, results in an increased percentage of LAAP pores in the 100–200 Angstrom diameter range when compared to use of a basic second solution having no tetramethylammonium.

In general, the calcined amorphous LAAP refractory composition for use herein will have a surface area of from about 50 $m^2/g$ to about 500 $m^2/g$, preferably from about 100 $m^2/g$ to about 250 $m^2/g$; and a pore volume of from about 0.3 cc/g to about 1.5 cc/g, preferably from about 0.5 cc/g to about 1.0 cc/g.

The pore size distribution of the LAAP following calcination will include about 5 vol. % to about 20 vol. % within the pore size diameter range of 50 to 100 Angstroms, about 10 vol. % to about 35 vol. % within the pore size diameter range of 100 to 150 Angstroms, about 15 vol. % to about 50 vol. % within the pore size diameter range of 150 to 200 Angstroms and about 10 vol. % to about 50 vol. % with the pore size diameter range of 200 to 400 Angstroms.

A further distinguishing feature of the LAAP composition for use herein is its ability to sorb vapor molecules of water, cyclohexane and n-hexane in an Equilibrium Sorption Test, hereinafter detailed, following calcination at 1000° F. for 6 hours, of greater than about 10 wt. % water, greater than about 6 wt. % cyclohexane and greater than about 5 wt. % n-hexane.

The relative proportions of components of the amorphous refractory LAAP composition for use herein as catalyst support in terms of lanthanum oxide:aluminum oxide:aluminum phosphate (weight relationships) will be from about 10:20:70 to about 90:5:5, especially from about 25:20:55 to about 30:25:45.

The present process for upgrading petroleum vacuum or atmospheric residua is an improvement over the art. For instance, and as shown in examples which follow, cobalt-molybdenum metals supported on the refractory oxide LAAP material outperform conventional cobalt-molybdenum on alumina for upgrading atmospheric or vacuum resids by hydrotreating.

Catalyst comprising the amorphous LAAP composition for use in this invention include various catalytic metals, such as, for example, copper, zinc or a metal of groups IIIB (e.g. Sc, Y and La), IVB (e.g. Ti and Zr), VB (e.g. V), VIB (e.g. Cr, Mo and W), VIIB (e.g. Mn) or VIII (e.g. Fe, Co, Ni, Ru, Rh, Pd, Ir and Pt) of the Periodic Table of Elements. Preferred metals include cobalt, molybdenum, nickel and tungsten, alone or in combination with each other or another metal of the above-listed Periodic Table groups. The catalyst will comprise from about 0.1 wt. % to about 25 wt. %, preferably from about 2 wt. % to about 15 wt. %, incorporated catalytic metal or metals.

The above metal component can be impregnated into the amorphous solid LAAP composition or intimately physically admixed therewith. Such component can be impregnated in or on it such as, for example, by, in the case of platinum, treating the amorphous LAAP composition with a solution containing a platinum metal-containing ion. Thus, suitable platinum compounds include chloroplatinic acid, platinous chloride and various compounds containing the platinum amine complex.

The catalyst for use in this invention may be, either before or after incorporation of the catalytic metal component, dehydrated, at least partially. This can be done by heating to a temperature in the range of 200° C. to 595° C. in an inert atmosphere, such as air, nitrogen, etc., and at atmospheric, subatmospheric or superatmospheric pressures for between 15 minutes and 48 hours. Dehydration can also be performed at room temperature merely by placing the material in a vacuum, but a longer time is required to obtain a sufficient amount of dehydration.

The catalyst, before or after metal incorporation, may be beneficially thermally treated prior to use in the present process by heating at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C.

The catalyst for use herein can be, before or after catalytic metal incorporation, shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the material is molded, such as by extrusion, it can be extruded before drying or partially dried and then extruded.

Although lanthana, alumina and aluminum phosphates are known individually, their combination composition for use as catalyst support herein is newly found. The utility of the LAAP-based catalyst for the present process is newly found.

The present process is carried out in a fixed bed downflow (e.g. trickle bed) reactor at a hydrogen partial pressure greater than about 400 psig, preferably from about greater than 400 psig to about 3500 psig; a temperature of from about 600° F. to about 900° F., preferably from about 675° F. to about 850° F., and a liquid hourly space velocity (LHSV) of from about 0.05 $hr^{-1}$ to about $20hr^{-1}$, preferably from about 0.1 $hr^{-1}$ to about 10 $hr^{-1}$.

In order to more fully illustrate the nature of the invention and the manner of practicing same, the followig examples, with all "parts" by weight, are presented. In the examples, whenever adsorption data are set forth for comparison of sorptive capacities for water, cyclohexane and/or n-hexane, they were determined as follows:

A weighed sample of the calcined adsorbent was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the adsorbent, the decrease in pressure caused the monostate to open a valve which admitted more adsorbate vapor to the chamber to restore the above control pressures. Sorption was complete when the pressure change was not sufficient to activate the manostat. The increase in weight was calculated as the adsorption capacity of the sample in g/100g of calcined adsorbant.

LAAP PREPARATION

Example 1

A first solution of aluminum (3+) and lanthanum (3+) in phosphoric acid was prepared as follows. First, 26 parts of $Al(NO_3)_3.9H_2O$ was dissolved in 68 parts of distilled water. Next, 6 parts of $La(NO_3)_3.6H_2O$ was dissolved in 68 parts of distilled water. The two solutions were thoroughly mixed together. Finally, a solution of 4 parts of 85 wt. % $H_3PO_4$ was added to the La-Al solution. The solution was thoroughly mixed and no solids were formed at this stage.

A second solution was prepared in a separate vessel of 27 parts of 29.9% $NH_3$ solution dissolved in about 27 parts of distilled water.

The precipitation procedure was carried out with the first and second solutions being slowly added simultaneously to a medium of 68 parts of distilled water with rapid mechanical stirring. The pH was maintained as close to 9.0 as possible at all times. The entire procedure was carried out at room temperature. After the precipitation was complete, the white slurry was stirred an additional 5 minutes, filtered rapidly, washed with distilled water and dried at 250° F. overnight. The recovered dry cake was calcined for 3 hours in flowing nitrogen at 1000° F. and in air for an additional 3 hours.

Stoichiometries used in the LAAP synthesis of this example are presented in Table 1, hereinafter.

Example 2

The same lanthanum-aluminum-phosphoric acid first solution as in Example 1 was prepared. The second solution used was commercial (Southwestern Analytical Chemicals) tetramethylammonium hydroxide, 25 wt. %. The same precipitation procedure as in Example 1 was followed, and the recovered dry cake was calcined as in Example 1.

Stoichiometries used in the synthesis of this example are presented hereinafter in Table 1.

Example 3

The same lanthanum-aluminum-phosphoric acid first solution as in Example 1 was prepared. The second solution used was prepared by dissolving 51 parts of 29% $NH_3$ in 68 parts of distilled water and adding 20 parts of n-propylamine. The precipitation procedure followed was the same as in Example 1 with 13 parts of the base solution left unused. The product recovered was dried at 250° F. and calcined as in Example 1.

Stoichiometries used in the synthesis of this example are presented in Table 1 hereinafter.

Example 4

Samples of the calcined products for Examples 1, 2 and 3 were submitted for elemental and physical property analyses. Results of these analyses are presented below in Table 2.

TABLE 1

| Example | Mole Percent | | | | | | pH |
|---|---|---|---|---|---|---|---|
| | La | Al | P | NH₄OH | TMAOH | NPA | |
| 1 | 1.9 | 9.5 | 4.9 | 83.7 | — | — | 9 |
| 2 | 3.8 | 18.8 | 9.8 | — | 67.6 | — | 9 |
| 3 | 2.5 | 12.4 | 6.5 | 57.2 | — | 21.4 | 9 |

TABLE 2

| Chemical and Physical Properties | | | |
|---|---|---|---|
| Example | 1 | 2 | 3 |
| Analysis, wt. % | | | |
| $La_2O_3$ | 27.8 | 28.0 | 29.2 |
| $Al_2O_3$ | 41.7 | 41.9 | 41.1 |
| $P_2O_5$ | 28.26 | 28.81 | 26.79 |
| Ash | 99.30 | 98.07 | 98.77 |
| BET Surface Area, $m^2/g$ | 192 | 184 | 158 |
| Pore Vol, cc/g | | | |
| $N_2$ | 0.93 | 0.79 | 0.99 |
| Hg | 1.01 | 0.74 | — |
| Pore Size Distribution, % Pore Volume in Pores of | | | |
| 0–30 Angstroms Diameter | 0.3 | 0.0 | 0.0 |
| 30–50 | 2.0 | 1.2 | 0.7 |
| 50–100 | 10.9 | 11.4 | 9.8 |
| 100–150 | 20.5 | 31.8 | 23.6 |
| 150–200 | 21.7 | 44.1 | 23.4 |
| 200–400 | 36.6 | 11.3 | 35.6 |
| 400–600 | 8.0 | 0.2 | 6.9 |
| Sorptions, wt. % | | | |
| $H_2O$ | 11.7 | 11.5 | 10.4 |
| $C_y$–$C_6$ | 9.3 | 8.1 | 7.4 |
| n-$C_6$ | 6.3 | 5.7 | 6.3 |

CATALYST PREPARATION AND EVALUATION

Example 5

To demonstrate utility of the present invention, samples of the Example 1 and 2 products were impregnated with 10 wt. % $MoO_3$ and 3.5 wt. % CoO. The impregnated catalysts were, subsequently, sulfided and evaluated for metals, sulfur, CCR and asphaltene removal in shaker bomb experiments with Arab Light vacuum resid with the following properties:

| Elemental Analysis (wt. %) | |
|---|---|
| Hydrogen | 10.68 |
| Sulfur | 3.93 |
| Nitrogen | 0.31 |
| CCR | 16.96 |
| Asphaltenes | 10.93 |
| Metal Analysis (ppm) | |
| Nickel | 16 |
| Vanadium | 65 |
| Iron | 12 |
| Sodium | 6 |
| Kinematic Viscosity (cs) | |
| 212° F. | 496.2 |
| 300° F. | 24.6 |

Shaker bomb testing has been shown to very closely simulate the resid upgrading activities observed in continuous downflow units. See S. M. Oleck and H. S. Sherry, *Fresh Water Manganese Nodules As A Catalyst For Demetallizing and Desulfurizing Petroleum Residua,* Ind. Eng. Chem., Process Des. Dev., 16 (4), 525 (1977), which is hereby incorporated by reference. A conventional apparatus is shown in J. W. Payne, C. W. Streed, and E. R. Kent, *The Shaker Bomb-A New Laboratory Tool For Studying Thermal Processes,* Ind. Eng. Chem., 50 (1), 47 (1958), hereby incorporated by reference.

The shaker bomb experiments were conducted at an oil/catalyst weight ratio of 20/1, a temperature of 750° F., and a hydrogen pressure of 2000 psig, with reaction time controlled to be 80 minutes.

At the conclusion of each run, the catalyst and oil were separated and the oil was submitted for analysis. The effectiveness of each catalyst for resid upgrading was determined by comparing the degree of demetalation, desulfurization, CCR removal, etc., to that observed in an identical run in which a conventional $CoMo/Al_2O_3$ catalyst was used. Properties of the $CoMo/Al_2O_3$ catalyst are given in Table 3. Thermal contributions were determined from a blank run at identical conditions but with not catalyst present.

In Table 4 the results of the catalyst activity study are listed. At equivalent mesh sizes, the CoMo-impregnated LAAP catalysts for use in this invention have greater demetalation activity than the conventional $CoMo/Al_2O_3$ catalyst (62% and 57% vs 49%). In addition, sulfur removal activities of the presently used catalysts are better (43% and 41% vs 36%). Nickel levels in the treated products actually increase due to contamination that can be traced back to the stainless steel walls of the shaker bombs.

The simultaneous increase in demetalation and sulfur removal activities was unexpected. Often, with other catalysts, an increase in the demetalation activity occurs at the apparent expense of the sulfur removal activity.

TABLE 3

| $CoMo/Al_2O_3$ Resid Demetalation Catalyst Properties | |
|---|---|
| Metal Loading, wt. % | |
| $MoO_3$ | 12.5 |
| CoO | 3.5 |
| Physical Properties | |
| Surface Area, $m^2/g$ | 109 |
| Real Density, g/cc | 3.629 |
| Particle Density, g/cc | 1.221 |
| Pore Volume, cc/g | 0.543 |
| Avg. Pore Dia., Angstroms | 199 |
| Pore Size Distribution, % Pore Volume in Pores of | |
| 0–30 Angstrom Diameter | 14 |
| 30–50 | 1 |
| 50–80 | 1 |
| 80–100 | 2 |
| 100–150 | 23 |
| 150–200 | 37 |
| 200–300 | 13 |
| 300+ | 9 |

TABLE 4

| Comparison of Resid Upgrading CoMo-Impregnated Catalyst Performance | | | | | |
|---|---|---|---|---|---|
| Catalyst Support | None (Thermal) | $Al_2O_3$ | $Al_2O_3$ | Example 1 (LAAP) | Example 2 (LAAP) |
| Mesh Size | — | 1/32" | 14–30 | 14–30 | 14–30 |
| Conditions | | | | | |
| Temp., °F. | 750 | 750 | 750 | 750 | 750 |
| Pressure, psig | 2000 | 2000 | 2000 | 2000 | 2000 |
| Oil/Cat | — | 20 | 20 | 20 | 20 |
| Time, min. | 80 | 80 | 80 | 80 | 80 |
| Liquid Product Analysis | | | | | |
| Hydrogen, wt. % | 10.58 | 10.69 | 10.88 | 12.03 | 11.09 |
| Sulfur, wt. % | 3.47 | 2.52 | 2.52 | 2.25 | 2.31 |
| Nitrogen, wt. % | 0.32 | 0.26 | 0.26 | 0.27 | 0.24 |

TABLE 4-continued

Comparison of Resid Upgrading CoMo-Impregnated Catalyst Performance

| Catalyst Support | None (Thermal) | Al$_2$O$_3$ | Al$_2$O$_3$ | Example 1 (LAAP) | Example 2 (LAAP) |
|---|---|---|---|---|---|
| Vanadium, ppm | 70 | 40 | 33 | 25 | 28 |
| Nickel, ppm | 16 | 31 | 10 | 19 | 15 |
| CCR, wt. % | 16.00 | 13.55 | 14.44 | 16.61 | 14.22 |
| Asphaltenes, wt. % | 8.52 | 5.40 | — | 4.73 | 5.84 |
| Vanadium Removal, % | 0 | 38 | 49 | 62 | 57 |
| Asphaltene Removal, % | 22 | 51 | — | 57 | 47 |
| Sulfur Removal, % | 12 | 36 | 36 | 43 | 41 |
| CCR Removal, % | 6 | 20 | 15 | 2 | 16 |

Example 6

As a further comparison of catalyst performance in accordance with the present process, a cobalt and molybdenum-containing magnesia-alumina-aluminum phosphate catalyst, prepared as in copending application for patent Ser. No. 938,476, filed Dec. 5, 1986, was tested in the shaker bomb with the same feedstock as used in Example 5. Properties of this catalyst are shown in Table 5.

Performance results of the magnesia-alumina-aluminum phosphate catalyst in the test are shown in the following Table 6, along with the results obtained above for the present process using the LAAP catalysts. The shaker bomb experiment was conducted at an oil/catalyst weight ratio of 20/1, a temperature of about 750° F., and a hydrogen pressure of 2000 psig, with reaction time controlled to be 80 minutes. These conditions were the same as those used in Example 5.

TABLE 5

CoMo/Magnesia-Alumina-Aluminum Phosphate Resid Demetallation Catalyst Properties

| Metal Loading, wt. % | |
|---|---|
| MoO$_3$ | 10.0 |
| CoO | 3.5 |
| Surface Area, m$^2$/g | 131 |
| Pore Size Distribution of Support | |
| % Pore Volume in Pores of | |
| 0–30 Angstrom Diameter | 0 |
| 30–50 | 0 |
| 50–100 | 2.5 |
| 100–150 | 7.4 |
| 150–200 | 12.8 |
| 200–400 | 61.6 |
| 400–600 | 15.7 |

TABLE 6

Comparison of Resid Upgrading CoMo-Impregnated Catalyst Performance

| Catalyst Support | Example 6 Magnesia-Alumina-Aluminum Phosphate | Example 1 (LAAP) | Example 2 (LAAP) |
|---|---|---|---|
| Mesh Size | 14–30 | 14–30 | 14–30 |
| Conditions | | | |
| Temp., °F. | 750 | 750 | 750 |
| Pressure, psig | 2000 | 2000 | 2000 |
| Oil/Cat | 20 | 20 | 20 |
| Time, min. | 80 | 80 | 80 |
| Liquid Product Analysis | | | |
| Hydrogen, wt. % | 10.85 | 12.03 | 11.09 |
| Sulfur, wt. % | 2.70 | 2.25 | 2.31 |
| Nitrogen, wt. % | 0.28 | 0.27 | 0.24 |
| Vanadium, ppm | 25 | 25 | 28 |
| Nickel, ppm | 21 | 19 | 15 |
| CCR, wt. % | 15.28 | 16.61 | 14.22 |
| Asphaltenes, wt. % | 5.50 | 4.73 | 5.84 |

TABLE 6-continued

Comparison of Resid Upgrading CoMo-Impregnated Catalyst Performance

| Catalyst Support | Example 6 Magnesia-Alumina-Aluminum Phosphate | Example 1 (LAAP) | Example 2 (LAAP) |
|---|---|---|---|
| Vanadium Removal, % | 62 | 62 | 57 |
| Asphaltene Removal, % | 50 | 57 | 47 |
| Sulfur Removal, % | 31 | 43 | 41 |
| CCR Removal, % | 10 | 2 | 16 |

At equivalent mesh sizes, the CoMo-impregnated LAAP catalyst for use herein prove to have greater sulfur removal activity than the CoMo-impregnated magnesia-alumina-aluminum phosphate catalyst of Example 6 (43% and 41% vs 31%) at about the same demetalation activity (62% and 57% vs 62%).

The improvement provided by the present invention is clear from the above resid hydrotreating experiments.

Because of the high pressures required for resid hydroprocessing, it is desirable from an economic standpoint to minimize reactor volume. Use of metal-containing LAAP support as in the present invention will allow a refiner to attain the required degree of metals removal with less catalyst and, consequently, in a smaller reactor. Alternatively, using catalysts comprising the LAAP support composition in existing reactors will allow a refiner to run at lower reaction severities or to attain processed resids with improved quality.

We claim:

1. A process for upgrading a petroleum residual feedstock which comprises contacting said feedstock under hydrotreating conditions with hydrogen and a catalyst composition comprising a catalytic component selected from the group consisting of metals of groups IIIB, IVBVB, VIB, VIIB and VII of the Periodic Table of Elements, copper, zinc, and combinations thereof, and a catalyst support comprising precipitated amorphous combination of lanthana, alumina and aluminum phosphate.

2. The process of claim 1 wherein said catalyst support is characterized after calcination by a surface area of from about 50 m$^2$/g to about 500 m$^2$/g, a pore volume of from about 0.3 cc/g to about 1.5 cc/g, and Equilibrium Sorption capacities of greater than 10 wt. % for the water vapor, greater than 6 wt. % for cyclohexane vapor and greater than 5 wt. % for n-hexane vapor, said lanthana, alumina and aluminum phosphate being present in the combination support, by weight, at from about 10:20:70 to about 90:5:5.

3. The process of claim 2 wherein said catalyst support is further characterized after calcination by a pore size distribution including about 5 vol. % to about 20 vol. % within the pore size diameter range of 50 to 100 Angstroms, about 10 vol. % to about 35 vol. % within the pore size diameter range of 100 to 150 Angstroms, about 15 vol. % to about 50 vol. % within the pore size diameter range of 150 to 200 Angstroms and about 10 vol. % to about 50 vol. % with the pore size diameter range of 200 to 400 Angstroms.

4. The process of claim 1 wherein said catalytic component is cobalt, molybdenum, nickel, tungsten or a combination thereof.

5. The process of claim 1 wherein said catalyst composition comprises from about 0.1 wt. % to about 25 wt. % catalytic component.

6. The process of claim 4 wherein said catalyst composition comprises from about 0.1 wt. % to about 25 wt. % catalytic component.

7. The process of claim 1 wherein said hydrotreating conditions include a hydrogen partial pressure greater than about 400 psig, a temperature of from about 600° F. to about 900° F., and a liquid hourly space velocity of from about 0.05 hr$^{-1}$ to about 20 hr$^{-1}$.

8. The process of claim 2 wherein said catalyst support is characterized after calcination by a surface area of from about 100 m$^2$/g to about 250 m$^2$/g, a pore volume of from about 0.5 cc/g to about 1.0 cc/g, said lanthana, alumina and aluminum phosphate being present in the combination support, by weight, at from about 25:20:55 to about 30:25:45.

9. The process of claim 8 wherein said catalyst support is further characterized after calcination by a pore size distribution including about 5 vol. % to about 20 vol. % within the pore size diameter range of 50 to 100 Angstroms, about 10 vol. % to about 35 vol. % within the pore size diameter range of 100 to 150 Angstroms, about 15 vol. % to about 50 vol. % within the pore size diameter range of 150 to 200 Angstroms and about 10 vol. % to about 50 vol. % with the pore size diameter range of 200 to 400 Angstroms.

10. The process of claim 8 wherein said catalytic component is cobalt, molybdenum, nickel, tungsten or a combination thereof.

11. The process of claim 1 wherein said catalyst composition comprises from about 2 wt. % to about 15 wt. % catalytic component.

12. The process of claim 8 wherein said catalyst composition comprises from about 2 wt. % to about 15 wt. % catalytic component.

13. The process of claim 10 wherein said catalyst composition comprises from about 2 wt. % to about 15 wt. % catalytic component.

14. The process of claim 7 wherein said hydrotreating conditions include a hydrogen partial pressure of from greater than about 400 psig to about 3500 psig, a temperature of from about 675° F. to about 850° F., and a liquid hourly space velocity of from about 0.1 hr$^{-1}$ to about 10 hr$^{-1}$.

15. The process of claim 8 wherein said hydrotreating conditions include a hydrogen partial pressure of from greater than about 400 psig to about 3500 psig, a temperature of from about 675° F. to about 850° F., and a liquid hourly space velocity of from about 0.1 hr$^{-1}$ to about 10 hr$^{-1}$.

* * * * *

UNITED STATES PATENT AND TRADEMARK OFFICE
CERTIFICATE OF CORRECTION

PATENT NO. : 4,810,361

DATED : March 7, 1989

INVENTOR(S) : R.P.L. Absil et al

It is certified that error appears in the above-identified patent and that said Letters Patent is hereby corrected as shown below:

Col. 1, line 57, delete "ps"
Col. 5, line 45, "followig" should be --following--
Col. 10, line 51, "IVBVB" should be --IVB, VB--
Col. 10, line 51, "VII" should be --VIII--

Signed and Sealed this

Thirty-first Day of October, 1989

Attest:

DONALD J. QUIGG

Attesting Officer      Commissioner of Patents and Trademarks